United States Patent [19]

Wells et al.

[11] Patent Number: 5,371,515
[45] Date of Patent: Dec. 6, 1994

[54] METHOD AND APPARATUS FOR NON-LINEAR DITHERING OF DIGITAL IMAGES

[75] Inventors: Stuart C. Wells, Santa Clara; Grant J. Williamson, Sunnyvale, both of Calif.

[73] Assignee: Sun Microsystems, Inc., Mountain View, Calif.

[21] Appl. No.: 413,991

[22] Filed: Sep. 28, 1989

[51] Int. Cl.$^5$ .............................................. G09G 5/10
[52] U.S. Cl. ..................................... 345/149; 358/457
[58] Field of Search ............... 340/701, 703, 723, 724, 340/728, 739, 747, 767, 793; 358/160, 168, 169, 240, 455, 456, 457, 458, 459; 345/147, 149

[56] References Cited

U.S. PATENT DOCUMENTS

| | | | |
|---|---|---|---|
| 3,997,719 | 12/1976 | Judice | 340/793 |
| 4,651,293 | 3/1987 | Kato | 358/457 |
| 4,706,077 | 11/1987 | Roberts et al. | 340/728 |
| 4,736,254 | 4/1988 | Kotera et al. | 358/457 |
| 4,796,094 | 1/1989 | van Dorsselaer | 358/457 |
| 4,823,189 | 4/1989 | Haines et al. | 358/457 |

OTHER PUBLICATIONS

Gerald Goertzel, Gerald R. Thompson, "Digital half-toning on the IBM 4250 printer" *IBM General of Research and Development* vol. 31 No. 1 Jan. 1987.

*Primary Examiner*—Richard Hjerpe
*Attorney, Agent, or Firm*—Blakely Sokoloff Taylor & Zafman

[57] ABSTRACT

The method and apparatus of the present invention takes into consideration that the eye is more sensitive to intensity variations at low levels of intensity than at high levels of intensity and produces higher quality dithered images by employing a sectioned or piecewise linear quantization strategy which sacrifices the fineness of interval spacing at the high end of the intensity scale in order to achieve greater accuracy of reproduction at the low end. The input intensity values are divided into a plurality of sub-ranges indicative of low intensities and high intensities. The number of input intensity levels allocated to the low intensity sub-ranges is small and the number of quantized or output intensity levels allocated to the low intensity sub-ranges is large compared to those allocated to the high intensity sub-ranges such that the interval spacing at the low intensity sub-ranges is small to provide greater accuracy at the low intensity levels where the eye is most sensitive.

32 Claims, 12 Drawing Sheets

| | LOW RANGE | | | | | | | MID RANGE | | | | | | HIGH RANGE | | |
|---|---|---|---|---|---|---|---|---|---|---|---|---|---|---|---|---|
| INPUT | 0 | 9 | 18 | 27 | 36 | 45 | 54 | 71 | 88 | 105 | 122 | 139 | 156 | 189 | 222 | 255 |
| OUTPUT | 0 | 1 | 2 | 3 | 4 | 5 | 6 | 7 | 8 | 9 | 10 | 11 | 12 | 13 | 14 | 15 |
| INTERVAL | | 9 | 9 | 9 | 9 | 9 | 9 | 17 | 17 | 17 | 17 | 17 | 17 | 33 | 33 | 33 |

$$q(i) \begin{cases} i/9 & \text{FOR } 0 \leq i \leq 54 \\ ((i-54)/17) + 6 & \text{FOR } 54 < i \leq 56 \\ ((i-156)/33) + 121 & \text{FOR } 156 < i \leq 255 \end{cases}$$

| 0 | 7 | 1 | 6 |
|---|---|---|---|
| 4 | 2 | 5 | 3 |
| 1 | 6 | 0 | 7 |
| 5 | 3 | 4 | 2 |

LOW RANGE MATRIX
(CONTAINS VALUES 0 - 7)

FIGURE 6A

| 1 | 15 | 2 | 12 |
|---|----|---|----|
| 9 | 5 | 10 | 6 |
| 3 | 13 | 0 | 14 |
| 11 | 7 | 8 | 4 |

MIDDLE RANGE MATRIX
(CONTAINS VALUES 0 - 15)

FIGURE 6B

| 2 | 30 | 4 | 24 |
|---|----|---|----|
| 18 | 10 | 20 | 12 |
| 6 | 26 | 0 | 28 |
| 22 | 14 | 16 | 8 |

HIGH RANGE MATRIX
(CONTAINS VALUES 0 - 30)

| 0 | 4 | 2 | 7 | 1 | 5 | 3 | 6 | 0 | 4 | 2 | 7 | 1 | 5 | 3 | 6 |

FIGURE 7B

| 0 | 8 | 4 | 10 | 2 | 12 | 6 | 14 | 1 | 9 | 5 | 11 | 3 | 13 | 7 | 15 |

FIGURE 7C

| 0 | 16 | 8 | 20 | 4 | 24 | 12 | 28 | 2 | 18 | 10 | 22 | 6 | 25 | 14 | 30 |

FIGURE 7D

| X | Y | INDEX | D(INDEX) | $G_{IN}$ | $BASE_{IN}$ | $BASE_{OUT}$ | $G_{OUT}$ | $G_{DISPLAY}$ | |
|---|---|---|---|---|---|---|---|---|---|
| | | | | | | | | BASE 10 | BASE 16 |
| 5 | 25 | 0 | 0 | 0 | 0 | 0 | 0 | 0 | 00 |
| 6 | 24 | 1 | 4 | 13 | 9 | 1 | 1 | 9 | 09 |
| 7 | 24 | 2 | 2 | 26 | 18 | 2 | 3 | 27 | 1b |
| 8 | 23 | 3 | 7 | 38 | 36 | 4 | 4 | 36 | 24 |
| 9 | 23 | 4 | 1 | 51 | 45 | 5 | 6 | 54 | 36 |
| 10 | 22 | 5 | 12 | 64 | 54 | 6 | 6 | 54 | 36 |
| 11 | 22 | 6 | 6 | 77 | 71 | 7 | 7 | 71 | 47 |
| 12 | 21 | 7 | 14 | 89 | 88 | 8 | 8 | 88 | 58 |
| 13 | 21 | 8 | 1 | 102 | 88 | 8 | 9 | 105 | 69 |
| 14 | 20 | 9 | 9 | 115 | 105 | 9 | 9 | 105 | 69 |
| 15 | 20 | 10 | 5 | 128 | 122 | 10 | 11 | 139 | 8b |
| 16 | 19 | 11 | 11 | 140 | 139 | 11 | 11 | 139 | 8b |
| 17 | 19 | 12 | 3 | 153 | 139 | 11 | 12 | 156 | 9c |
| 18 | 18 | 13 | 25 | 166 | 156 | 12 | 12 | 156 | 9c |
| 19 | 18 | 14 | 14 | 179 | 156 | 12 | 13 | 189 | bd |
| 20 | 17 | 15 | 30 | 191 | 189 | 13 | 13 | 189 | bd |
| 21 | 17 | 0 | 0 | 204 | 189 | 13 | 14 | 222 | de |
| 22 | 16 | 1 | 16 | 217 | 189 | 13 | 14 | 222 | de |
| 23 | 16 | 2 | 8 | 230 | 222 | 14 | 14 | 222 | de |
| 24 | 15 | 3 | 20 | 242 | 222 | 14 | 14 | 222 | de |
| 25 | 15 | 4 | 4 | 255 | 255 | 15 | 15 | 222 | ff |

| 7 | 5 | 6 | 4 | 3 | 0 | 2 | 1 | 7 | 5 | 6 | 4 | 3 | 0 | 2 | 1 |
|---|---|---|---|---|---|---|---|---|---|---|---|---|---|---|---|
| 0 | 4 | 2 | 6 | 1 | 5 | 3 | 7 | 0 | 4 | 2 | 6 | 1 | 5 | 3 | 7 |
| 4 | 1 | 3 | 0 | 7 | 5 | 6 | 2 | 4 | 1 | 3 | 0 | 7 | 5 | 6 | 2 |

FIGURE 8B

| 15 | 11 | 13 | 1 | 5 | 9 | 3 | 0 | 14 | 10 | 12 | 2 | 6 | 8 | 4 | 7 |
|---|---|---|---|---|---|---|---|---|---|---|---|---|---|---|---|
| 0 | 8 | 4 | 10 | 2 | 12 | 6 | 14 | 1 | 9 | 5 | 11 | 3 | 13 | 7 | 15 |
| 7 | 3 | 5 | 11 | 15 | 1 | 13 | 9 | 8 | 4 | 6 | 10 | 14 | 2 | 12 | 0 |

FIGURE 8C

| 30 | 22 | 26 | 2 | 10 | 18 | 6 | 0 | 28 | 20 | 24 | 4 | 12 | 16 | 8 | 14 |
|---|---|---|---|---|---|---|---|---|---|---|---|---|---|---|---|
| 0 | 16 | 8 | 20 | 4 | 24 | 12 | 28 | 2 | 18 | 10 | 22 | 6 | 26 | 14 | 30 |
| 14 | 6 | 10 | 22 | 30 | 2 | 26 | 18 | 16 | 8 | 12 | 20 | 28 | 4 | 24 | 0 |

FIGURE 8D

| X | Y | INDEX | | D(INDEX) | $G_{IN}$ | $BASE_{IN}$ | $BASE_{OUT}$ | $G_{OUT}$ | $G_{DISPLAY}$ | |
|---|---|---|---|---|---|---|---|---|---|---|
| | | | | | | | | | BASE 10 | BASE 16 |
| 4 | 27 | 0 | 0 | 7 | 0 | 0 | 0 | 0 | 0 | 00 |
| 4 | 26 | 0 | 1 | 0 | 0 | 0 | 0 | 0 | 0 | 00 |
| 4 | 25 | 0 | 2 | 4 | 0 | 0 | 0 | 0 | 0 | 00 |
| 5 | 26 | 1 | 0 | 5 | 0 | 0 | 0 | 0 | 0 | 00 |
| 5 | 25 | 1 | 1 | 5 | 0 | 0 | 0 | 0 | 0 | 00 |
| 5 | 24 | 1 | 2 | 1 | 0 | 0 | 0 | 0 | 0 | 00 |
| 6 | 25 | 2 | 0 | 6 | 5 | 0 | 0 | 0 | 0 | 00 |
| 6 | 24 | 2 | 1 | 2 | 5 | 0 | 0 | 1 | 9 | 09 |
| 6 | 23 | 22 | 2 | 3 | 0 | 0 | 0 | 0 | 0 | 00 |
| 7 | 25 | 3 | 0 | 4 | 3 | 0 | 0 | 0 | 0 | 00 |
| 7 | 24 | 3 | 1 | 6 | 14 | 9 | 1 | 1 | 9 | 09 |
| 7 | 23 | 3 | 2 | 0 | 3 | 0 | 0 | 1 | 9 | 09 |
| 8 | 24 | 4 | 0 | 3 | 15 | 9 | 1 | 2 | 18 | 12 |
| 8 | 23 | 4 | 1 | 1 | 15 | 9 | 1 | 2 | 18 | 12 |
| 8 | 22 | 4 | 2 | 7 | 0 | 0 | 0 | 0 | 0 | 00 |
| 9 | 24 | 5 | 0 | 0 | 7 | 0 | 0 | 1 | 9 | 09 |
| 9 | 23 | 5 | 1 | 5 | 28 | 27 | 3 | 3 | 27 | 1b |
| 9 | 22 | 5 | 2 | 5 | 7 | 0 | 0 | 1 | 9 | 09 |
| 10 | 23 | 6 | 0 | 2 | 25 | 18 | 2 | 3 | 27 | 1b |
| 10 | 22 | 6 | 1 | 3 | 25 | 18 | 2 | 3 | 27 | 1b |
| 10 | 21 | 6 | 2 | 6 | 0 | 0 | 0 | 0 | 0 | 00 |
| 11 | 23 | 7 | 0 | 1 | 10 | 9 | 1 | 1 | 9 | 09 |
| 11 | 22 | 7 | 1 | 7 | 42 | 36 | 4 | 4 | 36 | 24 |
| 11 | 21 | 7 | 2 | 2 | 10 | 9 | 1 | 1 | 9 | 09 |
| 12 | 22 | 8 | 0 | 7 | 35 | 27 | 3 | 3 | 27 | 1b |
| 12 | 21 | 8 | 1 | 0 | 35 | 27 | 3 | 4 | 36 | 24 |
| 12 | 20 | 8 | 2 | 4 | 1 | 0 | 0 | 0 | 0 | 00 |
| 13 | 22 | 9 | 0 | 5 | 13 | 9 | 1 | 1 | 9 | 09 |
| 13 | 21 | 9 | 1 | 9 | 56 | 54 | 6 | 6 | 54 | 36 |
| 13 | 20 | 9 | 2 | 1 | 13 | 9 | 1 | 2 | 18 | 12 |
| 14 | 21 | 10 | 0 | 6 | 45 | 45 | 5 | 5 | 45 | 2d |
| 14 | 20 | 10 | 1 | 2 | 45 | 45 | 5 | 5 | 45 | 2d |
| 14 | 19 | 10 | 2 | 3 | 1 | 0 | 0 | 0 | 0 | 00 |

FIGURE 8E

| X | Y | INDEX | | D(INDEX) | $G_{IN}$ | $BASE_{IN}$ | $BASE_{OUT}$ | $G_{OUT}$ | $G_{DISPLAY}$ | |
|---|---|---|---|---|---|---|---|---|---|---|
| | | | | | | | | | BASE 10 | BASE 16 |
| 15 | 21 | 11 | 0 | 4 | 16 | 9 | 1 | 2 | 18 | 12 |
| 15 | 20 | 11 | 1 | 11 | 70 | 54 | 6 | 7 | 71 | 47 |
| 15 | 19 | 11 | 2 | 0 | 16 | 9 | 1 | 2 | 18 | 12 |
| 16 | 20 | 12 | 0 | 6 | 55 | 54 | 6 | 6 | 54 | 36 |
| 16 | 19 | 12 | 1 | 3 | 55 | 54 | 6 | 6 | 54 | 36 |
| 16 | 18 | 12 | 2 | 7 | 1 | 0 | 0 | 0 | 0 | 00 |
| 17 | 20 | 13 | 0 | 0 | 20 | 18 | 2 | 3 | 27 | 1b |
| 17 | 19 | 13 | 1 | 13 | 84 | 71 | 7 | 7 | 71 | 47 |
| 17 | 18 | 13 | 2 | 5 | 20 | 18 | 2 | 22 | 18 | 12 |
| 18 | 19 | 14 | 0 | 4 | 66 | 54 | 6 | 7 | 71 | 47 |
| 18 | 18 | 14 | 1 | 7 | 66 | 54 | 6 | 7 | 71 | 47 |
| 18 | 17 | 14 | 2 | 6 | 1 | 0 | 0 | 0 | 0 | 00 |
| 19 | 19 | 15 | 0 | 1 | 23 | 18 | 2 | 3 | 27 | 1b |
| 19 | 18 | 15 | 1 | 15 | 98 | 88 | 8 | 8 | 88 | 58 |
| 19 | 17 | 15 | 2 | 2 | 23 | 18 | 2 | 3 | 27 | 1b |
| 20 | 18 | 0 | 0 | 15 | 75 | 71 | 7 | 7 | 71 | 47 |
| 20 | 17 | 0 | 1 | 0 | 75 | 71 | 7 | 8 | 88 | 58 |
| 20 | 16 | 0 | 2 | 4 | 1 | 0 | 0 | 0 | 0 | 00 |
| 21 | 18 | 1 | 0 | 5 | 26 | 18 | 2 | 3 | 27 | 1b |
| 21 | 17 | 1 | 1 | 8 | 112 | 105 | 9 | 9 | 105 | 69 |
| 21 | 16 | 1 | 2 | 1 | 26 | 18 | 2 | 3 | 27 | 1b |
| 22 | 17 | 2 | 0 | 13 | 86 | 71 | 7 | 8 | 88 | 58 |
| 22 | 16 | 2 | 1 | 4 | 86 | 71 | 7 | 8 | 88 | 58 |
| 22 | 15 | 2 | 2 | 3 | 2 | 0 | 0 | 0 | 0 | 00 |
| 23 | 17 | 3 | 0 | 4 | 30 | 27 | 3 | 3 | 27 | 1b |
| 23 | 16 | 3 | 1 | 10 | 127 | 122 | 10 | 10 | 122 | 7a |
| 23 | 15 | 3 | 2 | 0 | 30 | 27 | 3 | 4 | 36 | 24 |
| 24 | 16 | 4 | 0 | 5 | 96 | 88 | 8 | 9 | 105 | 69 |
| 24 | 15 | 4 | 1 | 2 | 96 | 88 | 8 | 99 | 105 | 69 |
| 24 | 14 | 4 | 2 | 7 | 2 | 0 | 0 | 0 | 0 | 00 |
| 25 | 16 | 5 | 0 | 0 | 16 | 9 | 1 | 2 | 18 | 12 |
| 25 | 15 | 5 | 1 | 12 | 70 | 54 | 6 | 7 | 71 | 47 |
| 25 | 14 | 5 | 2 | 5 | 16 | 9 | 1 | 2 | 18 | 12 |
| 26 | 15 | 6 | 0 | 2 | 0 | 0 | 0 | 0 | 0 | 00 |
| 26 | 14 | 6 | 1 | 3 | 0 | 0 | 0 | 0 | 0 | 00 |
| 26 | 13 | 6 | 2 | 6 | 0 | 0 | 0 | 0 | 0 | 00 |

METHOD AND APPARATUS FOR NON-LINEAR DITHERING OF DIGITAL IMAGES

BACKGROUND OF THE INVENTION

Field of the Invention

The method and apparatus of the present invention relates to dithering techniques used to represent digital images. More particularly, the method and apparatus of the present invention relates to the non-linear dithering of digital images.

RELATED APPLICATIONS

The present invention is related to U.S. application Ser. No. 07,413,984, filed Sep. 28, 1989 entitled "Method and Apparatus For Vector Aligned Dithering", U.S. application Ser. No. 07,413,977, filed Sep. 28, 1989 entitled "Method and Apparatus For The Dithering of Antialiased Vectors" and U.S. application Ser. No. 07,413,983, filed Sep. 28, 1989 entitled "Method and Apparatus for Dighering Graphic Images" and are herein incorporated by reference.

ART BACKGROUND

A picture or image may be thought of as a continuous representation of the object projected. It is often desirable to represent images on a digital computer display device such as a monitor or a printer. However, a computer and its output devices are binary in nature. A computer display comprises a grid of display elements, referred to as pixels, which can either be in one of a plurality of on states indicative of its intensity, in which the pixel location is illuminated, or in the off state in which the pixel location is not illuminated. In order to display continuous images, the continuous images must be converted to discrete representations corresponding to the pixel locations on the display device. A digital image is quantized in both the spatial domain and the intensity domain.

The amount of memory available dictates the quantized levels available to represent the image. If the resolution of either sample space (i.e. spatial and intensity) drops below a threshold (due to memory limitations), the eye will detect the discrete boundaries between samples. In the intensity domain, insufficient resolution is marked by the presence of artificial edges delimiting the transitions between regions of incremental intensity. Other undesirable visible effects, such as patterning, color shifting and biasing, are introduced due to the visible thresholding between quantized intensity levels.

To minimize the undesirable effects, a technique, referred to as dithering or digital halftoning, is used. Dithering is a technique which permits the simulation of intensity levels between quantized levels by permitting the eye to integrate fine detail within an area and record only the overall intensity of the area. Dithering aims to sacrifice some of an image's spatial resolution for an increase in perceived intensity resolution, accomplished by averaging the intensities of several neighboring pixels to simulate intensities that lie between quantization levels. Typically, this technique works well, since the eye naturally blends individual pixel values such that only the average intensity in the surrounding area or neighborhood is perceived. For more information on dithering, see Ulichney, *Digital Halftoning* (1987, MIT Press); Foley & Van Dam, *Fundamentals of Interactive Computer Graphics*, p. 597–602 (Addison-, Wesley, 1984).

Several types of dithering techniques exist. The types of dithering algorithms are distinguished by the way the neighborhoods are chosen. In the technique of ordered dither, the neighborhoods are chosen according to a two dimensional set of values, referred to as the dither table or dither matrix, which is tiled into the image's coordinate space. Typically for area dither, the table has the same number of row and column elements and the total number of entries in the table equals the number of simulatable intensity levels between the quantized levels. The values contained in the table are used to make decisions about which quantized intensity value will be output at each position, that is, should the intensity value be quantized to the quantized value above or below the original intensity value. The dither table values are different at each x,y coordinate location such that when a constant input intensity is dithered over some area, the output values will alternate in some pattern between the upper and lower quantized intensity levels.

The ordered dither process is explained in reference to FIG. 1. Process 1.0 determines the appropriate index into the dither matrix based on the x-y coordinates of the current pixel. Conceptually, the idea is to "tile" the dither matrix into the image coordinate space, thereby replicating each entry once every n pixels, where n is the dimension of the dither table. The indices to the matrix, i-j, are determined according to the following equations:

$$i = x \bmod n$$

$$j = y \bmod n$$

If n is a power of two, then it is possible to utilize the least significant bits of the x-y screen coordinates for indexing the dither matrix. For example, if the dimension of the dither matrix is 4×4, then the 2 least significant bits of the x-y coordinates will provide the required modulo-4 indexing.

At process 2.0, the dither values are retrieved from the matrix according to i-j dither indices determined. By the nature of the problem, the output intensity scale has fewer entries than the input intensity scale. In order to quantize the input value, there must be a predetermined correspondence between each level on the output scale to a value on the input scale. It is the task of process 3.0 to determine the input-scale base value, which is the input scale value that is nearest to but not greater than the original input intensity and which directly corresponds to a value in the stored range of intensities. The next process, 4.0, determines the value in the stored range of quantized intensity levels that corresponds to the input-scale base. This value will be referred to as the "stored range base value".

At process 5.0, the difference between the input intensity value and its input-scale base value is determined. The result, always guaranteed to be greater than or equal to zero, is the delta value passed along to process 6.0. Process 6.0 is the pivotal dither process, comparing the delta value to the dither value and outputting either the stored range base value or the next higher value. Specifically, if the delta value is less than or equal to the dither value, the stored range base value is output; if delta is greater than the dither value, then the stored range base plus one is output. The output from process 6.0 is the quantized pixel value that is deposited into the pixel store (e.g. a frame buffer).

Although quantized values are stored, these values are typically mapped back to an intensity scale with a greater intensity range for display viewing. That is the task of process 7.0, which is usually implemented by lookup-tables lying between the frame buffer output and the video display input. (This is not part of dithering per se, but is utilized for reconstruction of the dithered image for viewing.)

By performing processes 1.0 through 6.0 on successive input values, dithering causes values both greater than and less than the input intensity to ultimately be displayed, producing regions over which the overall average intensity is approximately equal to the original input intensity.

The dithering process is applied to all portions of the digital image for all intensities. However, it is known that the eye is more sensitive to variations at lower intensities than at higher intensities. Therefore results of the dithering process at lower intensities are not as effective as the results are at higher intensities.

SUMMARY OF THE INVENTION

It is therefor an object of the present invention to provide a method and apparatus for dithering digital images using non-linear quantization.

It is an object of the present invention to provide a method and apparatus for dithering in which the artificial variations in intensity the eye perceives are minimized.

It is further an object of the present invention to provide a method and apparatus for dithering digital images in which smaller quantization levels are used at lower intensities than at higher intensities, thereby accommodating for the greater sensitivity of the eye at lower intensities than at higher intensities.

The method and apparatus of the present invention takes into consideration that the eye is more sensitive to intensity variations at low levels than at high levels and produces higher quality dithered images by employing a sectioned or piecewise linear quantization strategy which sacrifices the fineness of interval spacing at the high end of the intensity scale in order to achieve greater accuracy of reproduction at the low end.

In a preferred embodiment, the input intensity values are divided into three ranges, a low range, medium range and high range. The spacing between output intensity levels at the low range is significantly smaller than the spacing between intensity levels at the medium range and high range. The medium range preferably has smaller spacing between intensity values than in the high range. In conjunction with the different interval spacing in the different ranges, separate dither matrices are employed providing the range of intermediate intensity values to be simulated.

Notation and Nomenclature

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

BRIEF DESCRIPTION OF THE DRAWINGS

The objects, features and advantages of the method and apparatus of the present invention will be apparent from the following detailed description of the invention in which:

FIGS. 6a, 6b and 6c illustrate exemplary dither matrices to be used with the preferred embodiment of the present invention.

FIGS. 7a, 7b, 7c, 7d, 7e and 7f illustrate a numerical example of an aliased vector employing a preferred embodiment of the present invention.

Figure 8A:
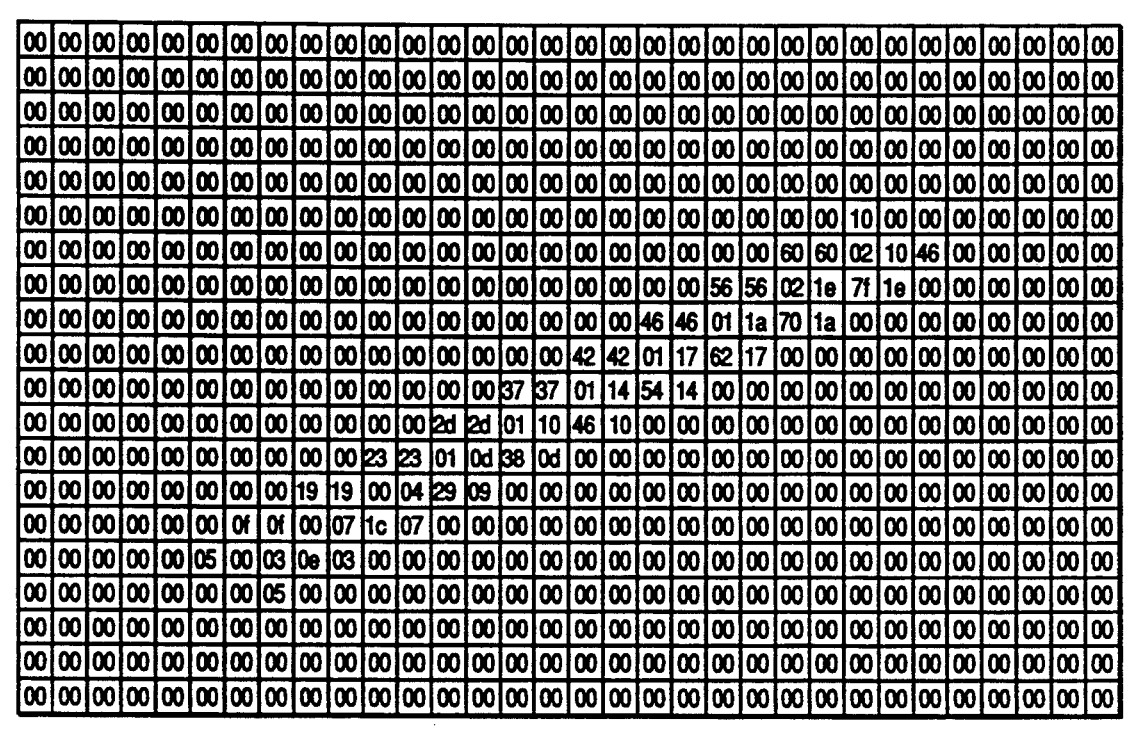
Figure 8G:
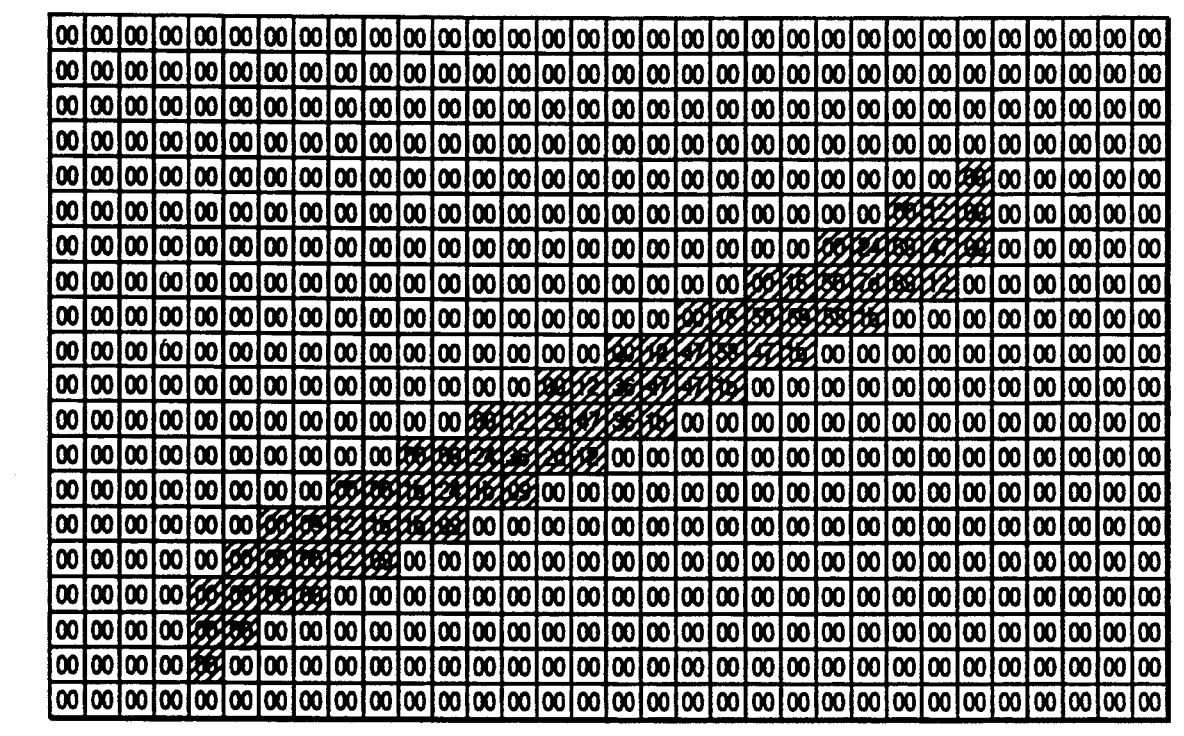

FIGS. 8a, 8b, 8c, 8d, 8e, 8f and 8g illustrate a numerical example of an anti-aliased vector employing a preferred embodiment of the present invention.

DETAILED DESCRIPTION OF THE INVENTION

GENERAL SYSTEM CONFIGURATION

Figure 2:
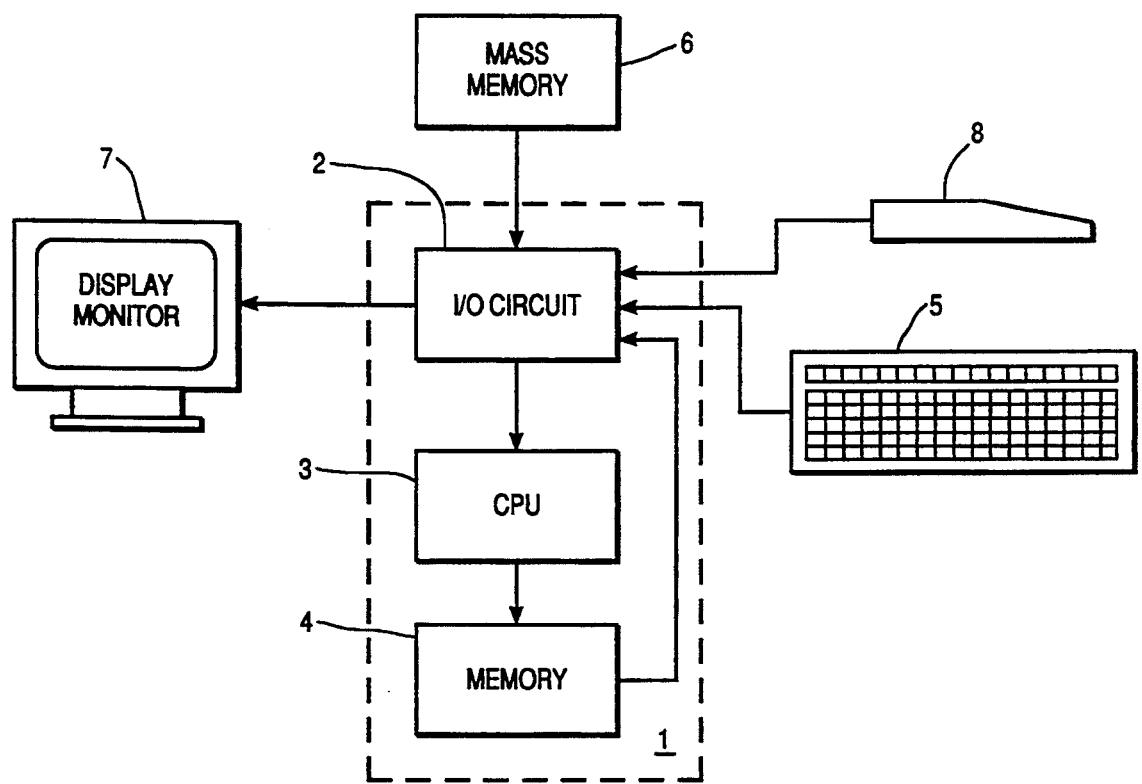
FIG. 2 depicts the illustrative computer system employed in the system of the present invention.

FIG. 2 shows a typical computer-based system for the dithering of digital images according to the present invention. Shown there is a computer 1 which comprises three major components. The first of these is the input/output (I/O) circuit 2 which is used to communicate information in appropriately structured form to and from the other parts of the computer 1. Also shown as a part of computer 1 is the central processing unit (CPU) 3 and memory 4. These latter two elements are those typically found in most general purpose computers and almost all special purpose computers. In fact, the several elements contained within computer 1 are intended to be representative of this broad category of data processors. Particular examples of suitable data processors to fill the role of computer 1 include machines manufactured by Sun Microsystems, Inc., Mountain View, Calif. Other computers having like capabilities may of course be adapted in a straightforward manner to perform the functions described below.

Also shown in FIG. 2 is an input device 5, shown in typical embodiment as a keyboard. It should be understood, however, that the input device may actually be a card reader, magnetic or paper tape reader, or other well-known input device (including, of course, another computer). A mass memory device 6 is coupled to the I/O circuit 2 and provides additional storage capability for the computer 1. The mass memory may include other programs and the like and may take the form of a magnetic or paper tape reader or other well known device. It will be appreciated that the data retained within mass memory 6, may, in appropriate cases, be incorporated in standard fashion into computer 1 as part of memory 4.

In addition, a display monitor 7 is illustrated which is used to display messages or other communications to the user. Such a display monitor may take the form of any of several well-known varieties of CRT displays. Preferably, the display monitor 7 displays the graphic images generated according to the process of the present invention. A cursor control 8 is used to select command modes and provides a more convenient means to input information into the system.

PROCESS DESCRIPTION

In the method and apparatus of the present invention a non-linear quantization model provides for smaller intensity interval spacing at the lower intensities at the cost of an increase in interval spacing at the higher intensities.

The range of input intensity values is divided into sections representing low intensity ranges, medium intensity ranges and high intensity ranges. The method of selecting the number of ranges to be employed is implementation dependent. In the following example described in which an 8 bit/color representation is dithered to 4 bit/color, 3 linear ranges have been used to approximate a logarithmic function. The choice of 3 ranges was based on the fact that the number of stored dithered values in an 8 to 4 bit dither per color component scheme is only 16. Using more than 3 ranges would have resulted in a better approximation to the desired logarithmic function but would also have required a greater amount of hardware and computational overhead with little significant improvement in image quality. However, dithering from an 8 to 5 bits per color component or higher might have justified the increase in hardware complexity and overhead for a greater number of ranges.

Figure 3:
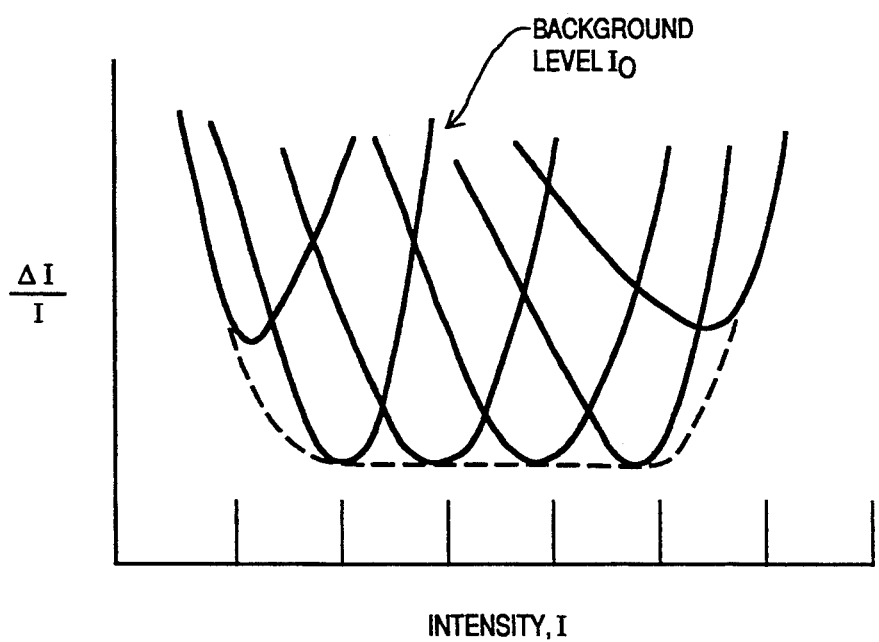
FIG. 3 illustrates a logarithmic function representing the sensitivity of the eye to varying intensity levels.

The number of ranges and the number of intensity levels in each range are selected such that the totality of the ranges encompasses the complete range of input intensity levels. Preferably the sections are selected to closely emulate the logarithmic function which describes the eyes' sensitivity to changes in intensity. For information on eye sensitivity to intensity see Pratt, *Digital Image Processing*, pp 32–47 (Wiley), Gonzalez and Wintz, *Digital Image Processing*, pp 13–21 (Addison-Wesley 1977); Netravali and Prasada, "Adaptive Quantization of Picture Signals Using Spatial Masking", *Proceedings of the IEEE*, Vol. 65, No. 4, (April 1977). An exemplary logarithmic function of the eyes' sensitivity to changes in intensity is shown in FIG. 3. FIG. 3 shows the functions of the ratio of changes in intensity, $\Delta I$ to intensity values I for a variety of background intensity values $I_o$.

Thus, for example, a logarithmic function of the eye sensitivity to changes in intensity is applied to an input range values which span from 0 to 255. Two intermediate points close to the logarithmic function are selected. A first straight line between 0 and the first point selected and is determined representative of one intensity range. A second straight line is determined between the two intermediate points which is representative of a second intensity range. A third intensity range corresponds to the straight line drawn between the second selected point and 255. Ideally, the position and length of the lines are selected so as to minimize the error between the desired logarithmic function and the piecewise (straight-line) approximation. Any straight line approximation technique, such as linear regression, may be used to minimize the approximation error.

The ranges may also be divided according to the locality of concentration of intensity values in the digital image. For example, it has been found that a great proportion of intensity values when the image is depth cued into a black background reside in the range of 0–100. Thus it is desirable to increase the number of quantized intensity values in the low range at the cost of decreasing the number of quantized intensity values in the high range.

Figures 5A, 5B, 5C:
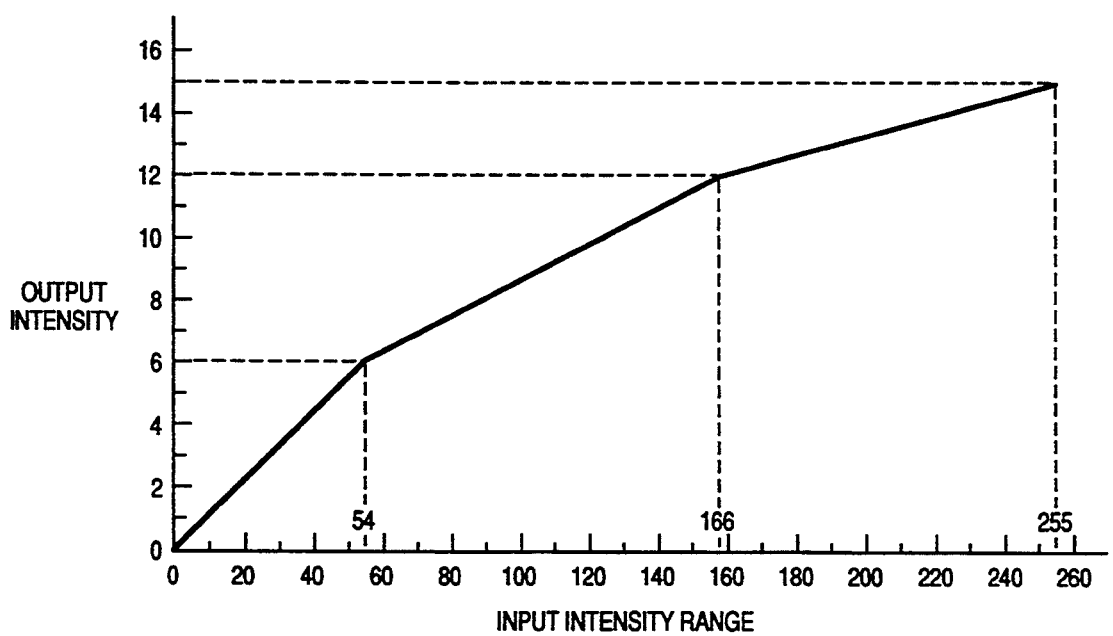
FIGS. 5a, 5b and 5c illustrate the sub-ranges of a preferred embodiment of the present invention.

Optimally, the intensity range should be divided into a large number of sub-ranges because the larger the number of sub-ranges, the more closely the eye sensitivity function may be emulated. However, the more sub-ranges utilized, the greater the CPU overhead and degradation in processing speed. Therefore, a balance between the number of sub-ranges and processing speed must be achieved. For instance, in the following example illustrated by FIGS. 5 and 6, the input range of intensities is divided into three sub-ranges—a low intensity range, a medium intensity range and a high intensity range, wherein input intensity values 0–54 are allocated to the low intensity sub-range, values 55–156 are allocated to the medium intensity sub-range and values 157–255 are allocated to the high intensity sub-range.

A dither matrix is then created for each of the sub-ranges, wherein the values in the dither matrix represent the intermediate intensity values between quantized output intensity levels. The dither matrix is a small two dimensional set of values which is used to determine which quantized intensity value will be output at each position. The values contained in the dither matrix comprise the intermediate intensity values between quantized levels. Thus, for example, if the quantized levels are separated by an interval spacing of 15, the dither matrix would contain the values 0 to 14. However, depending on such considerations as hardware configurations and memory allocations, the dither matrix can be modified slightly to not include all intermediate intensity values or to include more than one occurrence of each of the intermediate intensity values. For further information on the formation of dither matrices see Ulichney, *Digital Halftoning* (MIT Press, 1988); Foley and Van Dam, *Principles of Interactive Graphics*, pp. 597-602 (Addison-Wesley 1984).

The dithering process is then initiated for each of the pixels wherein the input intensity values are quantized to the quantized output intensity levels in such a manner that the eye integrates over areas of quantized intensity levels and perceives the intermediate intensity levels desired.

Figure 4:
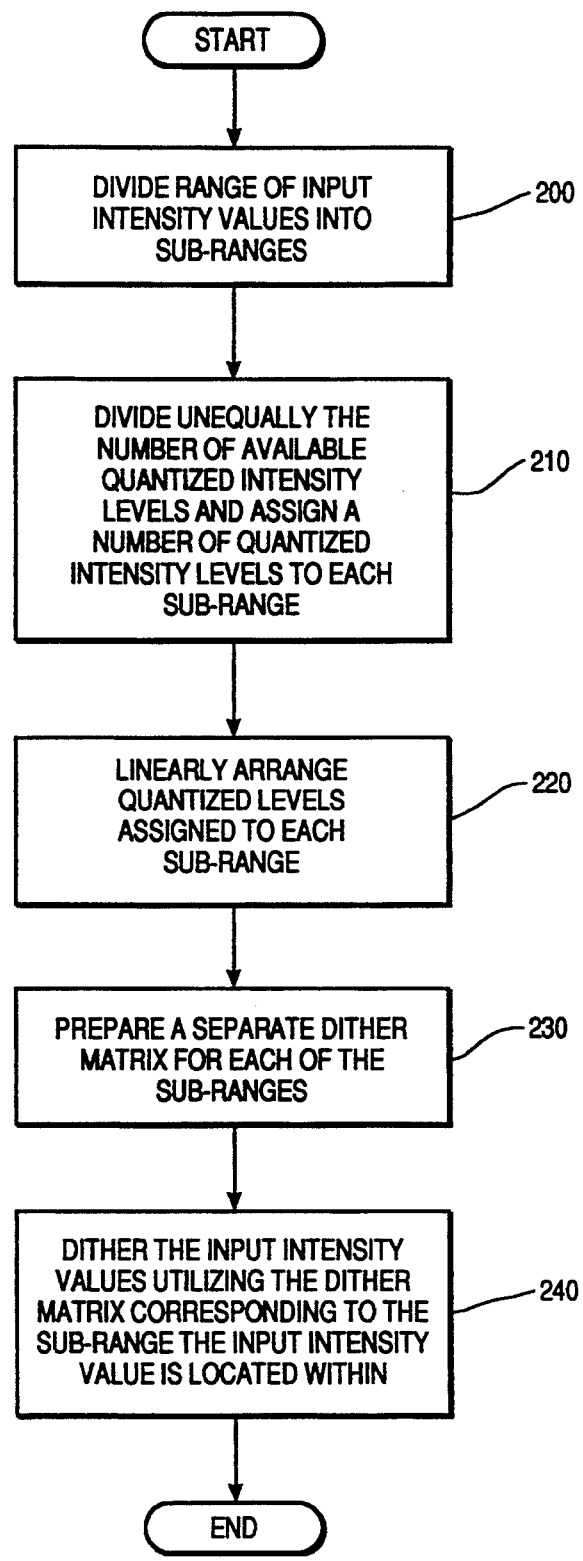
FIG. 4 is a flowchart depicting the preferred embodiment of the process of the present invention.

A preferred embodiment of the present invention is described with respect to the flow chart of FIG. 4. At block 200 the range of input intensity values are divided into sub-ranges indicative of low intensities, mid-range intensities and high intensities. Preferably the number of sub-ranges used is limited to three thereby minimizing the complexity of the process while maintaining the advantages of providing different interval spacing at different sub-ranges of intensities. The size of the ranges may be equal in size to cover the full range of input intensity ranges but it is preferred that the lower intensity range(s) is smaller than the high and medium intensity ranges to provide for the smaller interval spacing between quantized output levels.

At block 210 the total number of quantized output levels available are divided among the sub-ranges. Preferably the quantized levels are divided in such a manner that a larger number of quantized levels are associated with the low intensity range than the high intensity range. The larger number of quantized levels in the low intensity range, the smaller the interval spacing and therefore the greater the sensitivity to variations in intensity. The number of quantized levels per sub-range and the size of the sub-range determines the interval spacing between quantized output intensity levels and therefore the amount of sensitivity to variations in intensity levels.

At block 220 the quantized levels assigned to each sub-range are arranged within each sub-range. Preferably, the quantized levels assigned to each sub-range are linearly arranged within each sub-range such that within each range the quantized intensity levels are equally spaced apart to simplify the dither matrices utilized.

Figure 1:
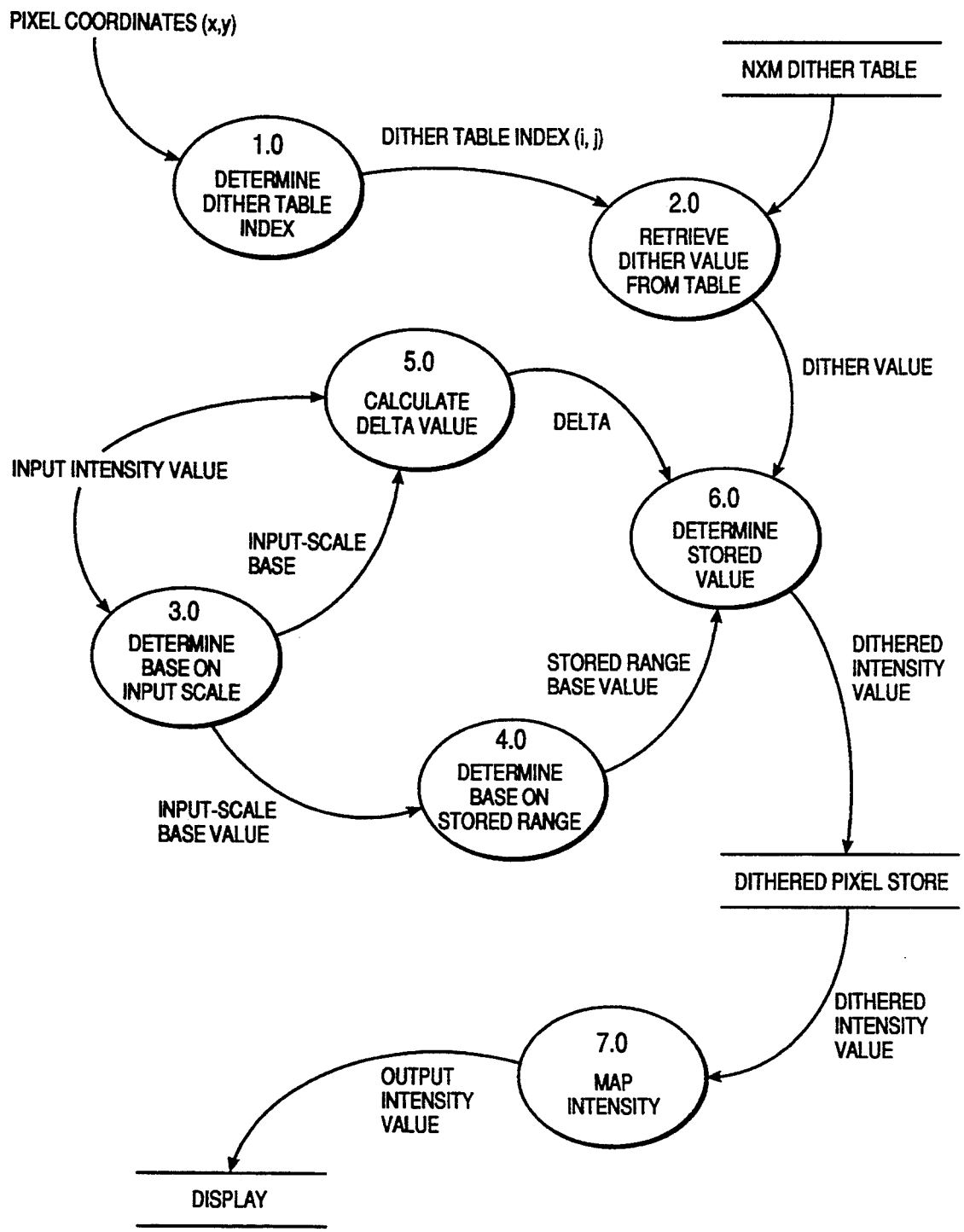
FIG. 1 is a flow diagram illustrative of a prior art ordered dithered process.

At block 230 a separate dither matrix is prepared for each of the sub-ranges and at block 240 the input intensity values are dithered to the quantized output intensity levels. The process is not limited to the type of dither process; however, the dither matrix used in the process must correspond to the sub-range the input intensity level is located within. An exemplary dither process is the ordered dither process described with respect to FIG. 1 in the art background section of the Specification.

The system of the present invention may best be described by an example of dithering an 8 bit intensity representation to a 4 bit intensity representation. It is preferred that the full input value range is mapped into the entire output value range, implying that input level 0 must map to output level 0, and input level 255 must map to output level 15. In the example illustrated by FIGS. 5 and 6, output intensity levels are allocated to input intensities in the range 0 to 54, 6 levels to the mid-range 54-156 and 3 levels to the high range 156-255. The quantization function is illustrated in tabular form in FIG. 5a graphically in FIG. 5b and functionally in FIG. 5c.

The dither matrices used in the present example are shown in FIGS. 6a, 6b and 6c. As stated previously, because the number of input intensities between each quantization level is different for each of the three ranges—9 for the first range, 17 for the second range and 33 for the third range—different dither matrix must be used for dithering values that fall into each of the three ranges.

Typically, a dither matrix should contain one element per intermediate intensity to be dithered, suggesting that the three required matrices should possess 9, 17 and 33 entries respectively. However, it is preferred, for purposes of optimal hardware design of this example, that a matrix comprises an even number of entries, more preferably a number of entries that are powers of two. In the present example each of the values are off a power of two by one. Thus if one is subtracted from each, the number of intermediate intensity levels between quantized levels are powers of two: $9-1=8=2^3$, $17-1=16=2^4$, $33-1=32=2^5$. This is further explained in copending patent application U.S. application Ser. No. 07/413,983, entitled "Method and Apparatus for Dithering Graphic Images".

Preferably the matrices employed for each of the ranges is of the same size such as the matrices illustrated in FIGS. 6a, 6b and 6c. FIG. 6a shows a third order matrix for the low intensity range of the present example containing values in the range of 0-7. For ease of indexing, there are two periods of the pattern replicated within the 4×4 matrix. FIG. 6b shows a dispersed dot matrix having 16 dither values in the range of 0-15 used for the mid-range intensity values.

The matrix for the high range of input values, shown in FIG. 6c, is the middle range matrix multiplied by two. The ideal matrix is a fifth order diamond matrix containing values 0-31, and would require a 64 entry (8×8) table for storage. In order to keep the storage requirements low, and also to maintain uniform indexing for all matrices, the smaller 4×4 table is preferred. Although the increment of two between dither matrix values causes pairs of input values to be mapped to identical output values, the visual effect is not perceived because the eye is much less sensitive to intensity variations at high intensities.

Once the sub-ranges and corresponding matrices have been established, the input intensity levels are dithered. An exemplary dithering process is the area dithering process set forth in FIG. 1. However, the process of the present invention is not limited to area dithering and may employ other dithering techniques such as vector aligned dithering described in co-pending U.S. application entitled "Method and Apparatus for Vector Aligned Dithering", Ser. No. 07/413,984 filed Sep. 28, 1989.

FIGS. 7a, 7b, 7c, 7d and 7f illustrate a first numerical example employing the method and apparatus of the present invention. FIG. 7a shows a shaded aliased vector drawn from (x,y) coordinates (5, 25) to (25, 25)

wherein the intensity level is interpolated along the span of the vector, beginning at 0 and ending at 255.

In the present example, the vector aligned dithering process described in co-pending U.S. application Ser. No. 07,413,984 filed Sep. 28, 1989 entitled "Method and Apparatus for Vector Aligned Dithering" is utilized to dither the vector from an eight bit representation to a four bit representation. However, as stated previously, the method and apparatus of the present invention is not limited to any one dithering process.

The dithering process is performed using the dither matrices shown on FIG. 7b, 7c and 7d. Each of the non-linear dither matrices is applied only to a limited range of intensities. More particularly, the first dither matrix (low intensity range matrix) is used for intensity values in the range 0–54, the second matrix (medium intensity range matrix) is used for intensity values in the range 55–156 and the third matrix (high intensity range matrix) is used for values in the range 157–255.

The results of the computations performed according to the process of the present invention are set forth in the table of FIG. 7e, where $G_{display}$ is the dithered output value, and graphically represented by the illustration set forth in FIG. 7f.

The column of the table of FIG. 7e labeled "X" and "Y" represents the x,y coordinates of the pixel. The column of the table of FIG. 7e labeled "index" represents the index (or indices) into the dither matrix. The column of the table of FIG. 7e labeled "D(index)" represents the dither matrix value at the specified index. The column of the table of FIG. 7e labeled "Gin" represents the 8-bit grey level (0–255) of the current pixel. This is the value input to the dithering process. The column of the table of FIG. 7e labeled "BASEin" represents the base value to which GIN is compared to determine which quantization range it falls into. The column of the table of FIG. 7e labeled "BASEout" represents the corresponding 4-bit value for generating dithered output. Depending upon the dither comparison result, either BASEout or BASEout+1 will be output. The column of the table of FIG. 7e labeled "Gout" represents the 4-bit grey level (0–15) which results from dithering Gin. This value (either BASEout or BASEout+1) is placed in the frame buffer. The column of the table of FIG. 7e labeled "Gdisplay" represents the 8-bit grey level (0–255) which is actually observed, produced by mapping the 4-bit frame buffer value to 8 bits via an output lookup table.

FIGS. 8a, 8b, 8c, 8d, 8e, 8f and 8g set forth a second numerical example in which an aliased vector three pixels in width is dithered using the method and apparatus of the present invention. The vector align dither process is again used in the present example on the vector illustrated in FIG. 8a, which is a shaded anti-aliased vector drawn from (x,y) coordinates (5, 25) to (25, 15). The intensity levels of the vector are interpolated along the span of the vector, beginning at the value of 0 and ending at 255.

The dithering process is performed using the dither matrices shown in FIG. 8b, 8c and 8d. Each dither matrix is a 3×16 matrix comprising the number of intermediate intensity values between quantized intensity levels. The 3×16 matrices are formed by three separate lines each containing a single occurrence of the number of intermediate intensity values wherein the emphasis on the arrangement of the values is to ensure that each of the three-entry columns sums up to approximately the same value. More particularly, the first matrix, the low intensity range matrix, consists of the values 0–7 reflective of the small interval spacing (8) in the low intensity range. The values are arranged such that the average intensity is maintained over a local area because there are only eight intermediate values and the width of the matrix is 16, the values are repeated to fill the matrix. Similarly, the second matrix, the medium range intensity matrix, consists of values 0–15 reflective of a slightly larger interval spacing (16).

The third dither matrix, the high intensity range matrix, consists of intermediate values 0 to 31 indicative of the large interval spacing (32). In order to fit the range of values into the 16 column matrix, the even values between 0 and 31 are utilized. As noted earlier, the increment of two between dither matrix values will cause pairs of input values to be mapped to identical output values, but such drawback is minimal because the eye sensitivity to intensity variations is greatly diminished at the higher intensities.

These dithered values may then be stored until the corresponding pixels are output to the look-up table for display on a display device. An output mapping function is generated which maps back the dithered intensity values to their original value. For example, the following functions are employed to map back the examples described above:

$$\text{Out}(q(i)) = \begin{cases} q(i) \times 9 & \text{for } 0 \leq q(i) \leq 6 \\ ((q(i) - 6) \times 17) + 54 & \text{for } 6 < q(i) \leq 12 \\ ((q(i) - 12) \times 33) + 156 & \text{for } 12 < q(i) \leq 15 \end{cases}$$

While the invention has been described in conjunction with the preferred embodiment, it is evident that numerous alternatives, modifications, variations and uses will be apparent to those skilled in the art in light of the foregoing description. Particularly it is evident that the invention is equally applicable to color images as it is to greyscale images. Furthermore, it is evident that the invention described is not limited to an 8 bit to 4 bit dithering process but is applicable to any dithering scheme.

We claim:

1. In a computer system comprising a central processing unit, a graphics display comprising a matrix of pixels, and a frame buffer, a method for dithering a digital image from an input intensity range to an output intensity range and displaying said digital image on said graphic display, said digital image comprising pixels, each pixel having an intensity value associated with it selected from the input intensity range, wherein the digital image is dithered from a p-bit intensity value per pixel to a q-bit intensity value per pixel, where p is a value greater than q, said method comprising the steps of:

dividing the range of input intensity values into sections;

assigning a section of the output intensity range to a corresponding section of the input intensity range whereby the elements in each output intensity section correspond to a quantized intensity value in the corresponding input intensity section, the number of integer values between quantized intensity values in a section of the input intensity range being an interval spacing for the section, the interval spacing for at least one section being different from the interval spacing for at least one other section;

generating a dither matrix for each section of the input intensity range, the number of values in the dither matrix equal to the count of intermediate intensity values between quantized intensity values in the respective sections, the elements in each dither matrix equal to values in the range of 0 and the quantity (interval spacing −1) for each section which are representative of the number of intermediate intensity values between quantized intensity levels, said elements organized to provide the desired visual perception of the intermediate intensity values;

retrieving a dither value from the dither matrix for each pixel value;

determining the quantized intensity value for a pixel value, said quantized intensity value being the value less than or equal to the pixel value;

determining an input-scale base value which corresponds to the quantized intensity value;

if the difference between the input intensity value and the input-scale base value is less than or equal to the retrieved dither value, setting the output intensity level for the pixel to be equal to the quantized intensity value;

if the difference between the input intensity value and the input-scale base value is greater than the retrieved dither value, setting the output intensity level for the pixel to be equal to a quantized intensity value which corresponds to the input-scale base value +1;

storing in the frame buffer the output intensity level for each pixel at a location corresponding to the pixel;

retrieving the pixels stored in the frame buffer; and generating an electrical signal to actuate the pixels on the graphic display such that each pixel is actuated at an intensity indicated by the stored output intensity level for the pixel;

whereby the sections are divided and assigned to provide actuated pixels at intensities which yield greater accuracy in one section at the cost of accuracy in another section.

2. The method of claim 1 wherein the step of dividing the range of input intensity values into sections comprises:

selecting a function of eye sensitivity to changes in intensity;

dividing the function into portions, the number of portions equaling the number of sections of the input intensity range;

computing a straight line approximation for each of the portions; and utilizing the straight line approximation to determine the elements of the output intensity range sections and the correspondence to the sections of the input intensity range.

3. The method of claim 2 wherein the output range of intensity values are selected according to the function of the eyes' sensitivity to changes in light intensity, the step of dividing the input range of intensity values comprises:

selecting two intermediate points along a curve representing the function of the eyes' sensitivity to changes in intensity;

determining the low intensity section to be the values along a straight line approximation between the beginning of the curve and the first intermediate point selected;

determining the mid intensity section of the output intensity range to be the values along a straight line approximation between the first intermediate value and the second intermediate value selected;

determining the high intensity section to be the values along a straight line approximation between the second intermediate value and the end of the curve;

whereby the output range of intensity values are proportionately assigned to the input intensity range.

4. The method of claim 1 wherein the step of dividing the range of input intensity value into section comprises:

determining the sections of the range having a greater concentration of occurrences of intensity values; and dividing the input intensity range such that the sections having the greater concentration of intensity values are smaller than the sections having a lesser concentration of intensity values.

5. The method of claim 4 wherein:

the digital image to be dithered is depth cued to a dark background; and the greatest concentration of occurrence of intensity values is at the low intensity values;

whereby a section around the low intensity values is smaller than a section around the high intensity values.

6. The method of claim 5 wherein:

p equals 8 thereby providing an input intensity range of 256 values;

q equals 4 thereby providing an output intensity range of 16 values; and the range of input intensity values is divided into a low intensity section mid-intensity section and high intensity section.

7. The method of claim 6 wherein:

the low intensity section of input intensity values extends from 0 to 54;

the mid intensity section of input intensity values extends from 55 to 156; and the high intensity section of input intensity values extends from 157 to 255.

8. The method of claim 7 wherein:

the step of assigning a section of the output intensity range to a corresponding section of the input intensity range comprises;

assigning output intensity values 0 to 6 to the low intensity section of input intensity values;

assigning output intensity values 7 to 12 to the mid intensity section of input intensity values;

assigning output intensity values 13 to 15 to the high intensity section of input intensity values; and the step of generating a dither matrix for each section comprises:

generating a dither matrix corresponding to the low intensity section having elements 0 to 7;

generating a dither matrix corresponding to the mid intensity section having elements 0 to 15;

generating a dither matrix corresponding to the high intensity section having elements 0 to 31.

9. In a computer system comprising a central processing unit, a graphics display, and a frame buffer, a method for dithering a digital image from an input range of intensity values to an output range of intensity values and displaying said digital image on said graphic display, the range of values determined by the number of bits representing each intensity value, said digital image comprising pixels, each pixel having an intensity value of p-bits associated with it within the first range of intensity values, wherein the digital image is dithered from a p-bit representation to a q-bit representation, the value of p being greater than the value of q, said method comprising the steps of:

dividing the input range of intensity values into sections representative of a low intensity section, mid intensity section and high intensity section;

dividing the output range of intensity values into sections representative of a low intensity section, mid intensity section and high intensity section to correspond respectively to the low intensity section, mid intensity section and high intensity section of the input intensity range, wherein the elements in each output intensity section correspond to a quantized intensity value in the corresponding input intensity section;

generating a dither matrix for each intensity section, the elements in each dither matrix equal to integer values in the range of 0 and the quantity (interval spacing $-1$) for the section, said elements representative of the number of intermediate intensity values between quantized intensity values in each section, said elements organized to provide the desired visual perception of the intermediate intensity values, the size of the range of integer values between quantized intensity values in each section of the input intensity range being the interval spacing for the section, the interval spacing for at least one section being different from the interval spacing for at least one other section;

retrieving a dither value from a dither matrix for each pixel value the dither matrix the dither value is retrieved from being dependent upon the input intensity value of the pixel;

determining the quantized intensity value for a pixel value, said quantized intensity value being the value less than or equal to the pixel value;

determining an input-scale base value which corresponds to the quantized intensity value;

if the difference between the input intensity value and the input-scale base value is less than or equal to the retrieved dither value, setting the output intensity level for the pixel to be equal to the quantized intensity value;

if the difference between the input intensity value and the input-scale base value is greater than the retrieved dither value, setting the output intensity level for the pixel to be equal to a quantized intensity value which corresponds to the input-scale base value $+1$;

storing in the frame buffer the output intensity level for each pixel at a location corresponding to the pixel;

retrieving the pixels stored in the frame buffer; and generating an electrical signal to actuate the pixels on the graphic display such that each pixel is actuated at an intensity indicated by the stored output intensity level for the pixel.

10. The method of claim 9 wherein a greater number output intensity values are located in the low intensity section than in the high intensity section to provide a higher precision of dithering for input intensity values within the low intensity section.

11. The method of claim 10 wherein the input range of intensity values are selected according to the function of the eyes' sensitivity to changes in light intensity, the step of dividing the input range of intensity values comprises:

selecting a function of eye sensitivity to changes in intensity;

selecting two intermediate points along a curve representing the function of the eyes' sensitivity to changes in intensity;

determining the low intensity section to be the values along a straight line approximation between the beginning of the curve and the first intermediate point selected;

determining the mid intensity section to be the values along a straight line approximation between the first intermediate value and the second intermediate value selected; and determining the high intensity section to be the values along a straight line approximation between the second intermediate value and the end of the curve.

12. The method of claim 9 wherein:

the digital image to be dithered is depth cued to a dark background;

the greatest concentration of occurrence of intensity values occurs within the low intensity section;

whereby the low intensity section is smaller than the mid and high intensity sections.

13. The method of claim 12 wherein:

p equals 8 thereby providing an input intensity range of 256 values;

q equals 4 thereby providing an output intensity range of 16 values;

the low intensity section of input intensity values extends from 0 to 54;

the mid intensity section of input intensity values extends from 55 to 156; and the high intensity section of input intensity values extends from 157 to 255.

14. The method of claim 13 wherein:

the low section of output intensity values ranges from 0 to 6, inclusive;

the mid section of output intensity values ranges from 7 to 12, inclusive; and the high section of output intensity values ranges from 13 to 15, inclusive;

the dither matrix corresponding to the low intensity section having elements in the range of 0 to 7;

the dither matrix corresponding to the mid intensity section having elements in the range of 0 to 15; and the dither matrix corresponding to the high intensity section having elements in the range of 0 to 31.

15. The method of claim 14 wherein the digital image is dithered using area dither and the dither matrices comprise the values:

$$\begin{vmatrix} 0 & 7 & 1 & 6 \\ 4 & 2 & 5 & 3 \\ 1 & 6 & 0 & 7 \\ 5 & 3 & 4 & 2 \end{vmatrix}$$

for the matrix which corresponds to the low intensity section;

$$\begin{vmatrix} 1 & 15 & 2 & 12 \\ 9 & 5 & 10 & 6 \\ 3 & 13 & 0 & 14 \\ 11 & 7 & 8 & 4 \end{vmatrix}$$

for the matrix which corresponds to the mid intensity section;

$$\begin{vmatrix} 2 & 30 & 4 & 24 \\ 18 & 10 & 20 & 12 \\ 6 & 26 & 0 & 28 \\ 22 & 14 & 16 & 8 \end{vmatrix}$$

for the matrix which corresponds to the high intensity section.

16. The method of claim 14 wherein the digital image is dithered using vector aligned dither and the dither matrices comprise the values:

|0 4 2 7 1 5 3 6 0 4 2 7 1 5 3 6| for the matrix which corresponds to the low intensity section;

|0 8 4 10 2 12 6 14 1 9 5 11 3 13 7 15| for the matrix which corresponds to the mid intensity section;

|0 16 8 20 4 24 12 28 2 18 10 22 6 25 14 30| for the matrix which corresponds to the high intensity section.

17. An apparatus for dithering a digital image from an input intensity range to an output intensity range and displaying said digital image, said digital image comprising pixels, each pixel having an intensity value associated with it selected from the input intensity range, wherein the digital image is dithered from a p-bit intensity value per pixel to a q-bit intensity value per pixel, where p is a value greater than q, said apparatus comprising:

a graphics display comprising a matrix of pixels;
a frame buffer;
means for dividing the range of input intensity values into sections;
means for assigning a section of the output intensity range to a corresponding section of the input intensity range whereby the elements in each output intensity section correspond to a quantized intensity value in the corresponding input intensity section;
a dither matrix for each section of the input intensity range, the number of values in the dither matrix equal to the count of integer values between quantized intensity values in the respective sections, the elements in each dither matrix equal to values in the range of 0 and the quantity (interval spacing for the section −1), which are representative of the intermediate intensity values between quantized intensity levels, said elements organized in the dither matrix to provide the desired visual perception of the intermediate intensity values, the size of the range of integer values between quantized intensity values in a section of the input intensity range being an interval spacing for the section, the interval spacing for at least one section being different from the interval spacing for at least one other section;
means for retrieving a dither value from the dither matrix for each pixel value;
means for determining the quantized intensity value for a pixel value, said quantized intensity value being the value less than or equal to the pixel value;
means for determining an input-scale base value which corresponds to the quantized intensity value;
output intensity level generator comprising;
 a comparator for comparing the input-scale base value to the retrieved dither value;
 if the difference between the input intensity value and the input-scale base value is less than or equal to the retrieved dither value, means for setting the output intensity level for the pixel to be equal to the quantized intensity value;
 if the difference between the input intensity value and the input-scale base value is greater than the retrieved dither value, means for setting the output intensity level for the pixel to be equal to a quantized intensity value which corresponds to the input-scale base value +1;
output means for storing in the frame buffer the output intensity level for each pixel at a location corresponding to the pixel;
frame buffer control means for retrieving the pixels stored in the frame buffer; and
means for generating an electrical signal to actuate the pixels on the graphic display such that each pixel is actuated at an intensity indicated by the stored output intensity level for the pixel;
whereby the sections are divided and assigned to provide actuated pixels at intensities which yield greater accuracy in one section at the cost of accuracy in another section.

18. The apparatus of claim 17 wherein the means for dividing the range of input intensity values into sections comprises:
means for selecting a function of eye sensitivity to changes in intensity;
means for dividing the function into portions, the number of portions equaling the number of sections of the input intensity range;
means for computing a straight line approximation for each of the portions; and
means for utilizing the straight line approximation to determine the elements of the output intensity range sections and the correspondence to the sections of the input intensity range.

19. The apparatus of claim 18 wherein the output range of intensity values are selected according to the function of the eyes' sensitivity to changes in light intensity, the means for dividing the input range of intensity values comprises:
means for selecting two intermediate points along a curve representing the function of the eyes' sensitivity to changes in intensity;
means for determining the low intensity section to be the values along a straight line approximation between the beginning of the curve and the first intermediate point selected;
means for determining the mid intensity section of the output intensity range to be the values along a straight line approximation between the first intermediate value and the second intermediate value selected;

means for determining the high intensity section to be the values along a straight line approximation between the second intermediate value and the end of the curve;

whereby the output range of intensity values are proportionately assigned to the input intensity range.

20. The apparatus of claim 17 wherein the means for dividing the range of input intensity value into section comprises:

means for determining the sections of the range having a greater concentration of occurrences of intensity values; and means for dividing the input intensity range such that the sections having the greater concentration of intensity values are smaller than the sections having a lesser concentration of intensity values.

21. The method of claim 20 wherein:

the digital image to be dithered is depth cued to a dark background; and the greatest concentration of occurrence of intensity values is at the low intensity values;

whereby a section around the low intensity values is smaller than a section around the high intensity values.

22. The apparatus of claim 21 wherein:

p equals 8 thereby providing an input intensity range of 256 values;

q equals 4 thereby providing an output intensity range of 16 values; and the range of input intensity values is divided into a low intensity section mid-intensity section and high intensity section.

23. The apparatus of claim 22 wherein:

the low intensity section of input intensity values extends from 0 to 54;

the mid intensity section of input intensity values extends from 55 to 156; and the high intensity section of input intensity values extends from 157 to 255.

24. The apparatus of claim, 23 wherein:

the means for assigning a section of the output intensity range to a corresponding section of the input intensity range comprises;

means for assigning output intensity values 0 to 6 to the low intensity section of input intensity values;

means for assigning output intensity values 7 to 12 to the mid intensity section of input intensity values;

means for assigning output intensity values 13 to 15 to the high intensity section of input intensity values; and the means for generating a dither matrix for each section comprises:

means for generating a dither matrix corresponding to the low intensity section having elements in the range of 0 to 7;

means for generating a dither matrix corresponding to the mid intensity section having elements in the range of 0 to 15;

means for generating a dither matrix corresponding to the high intensity section having elements in the range of 0 to 31.

25. An apparatus for dithering a digital image from an input range of intensity values to an output range of intensity values, the range of values determined by the number of bits representing each intensity value and displaying said digital image, said digital image comprising pixels, each pixel having an intensity value of p-bits associated with it within the first range of intensity values, wherein the digital image is dithered from a p-bit representation to a q-bit representation, the value of p being greater than the value of q, said method comprising the steps of:

a graphics display comprising a matrix of pixels;

a frame buffer;

means for dividing the input range of intensity values into sections representative of a low intensity section, mid intensity section and high intensity section;

means for dividing the output range of intensity values into sections representative of a low intensity section, mid intensity section and high intensity section to correspond respectively to the low intensity section, mid intensity section and high intensity section of the input intensity range, wherein the elements in each output intensity section correspond to a quantized intensity value in the corresponding input intensity section;

a dither matrix for each intensity section; the elements in each dither matrix equal to integer values in the range of 0 and the quantity (interval spacing for the section −9), which are representative of the number of intermediate intensity values between quantized intensity values in each section, said elements organized to provide the desired visual perception of the intermediate intensity values, the size of the range of integer values between quantized intensity values in a section of the input intensity range being the interval spacing for the section, the interval spacing for at least one section being different from the interval spacing for at least one other section;

means for retrieving a dither value from a dither matrix for each pixel value the dither matrix the dither value is retrieved from being dependent upon the input intensity value of the pixel;

means for determining the quantized intensity value for a pixel value, said quantized intensity value being the value less than or equal to the pixel value;

means for determining an input-scale base value which corresponds to the quantized intensity value;

if the difference between the input intensity value and the input-scale base value is less than or equal to the retrieved dither value, means for setting the output intensity level for the pixel to be equal to the quantized intensity value;

if the difference between the input intensity value and the input-scale base value is greater than the retrieved dither value, means for setting the output intensity level for the pixel to be equal to a quantized intensity value which corresponds to the input-scale base value +1;

output means for storing in the frame buffer the output intensity level for each pixel at a location corresponding to the pixel;

frame buffer control means for retrieving the pixels stored in the frame buffer; and means for generating an electrical signal to actuate the pixels on the graphic display such that each pixel is actuated at an intensity indicated by the stored output intensity level for the pixel.

26. The apparatus of claim 25 wherein a greater number output intensity values are located in the low intensity section than in the high intensity section to provide a higher precision of dithering for input intensity values within the low intensity section.

27. The method of claim 26 wherein the input range of intensity values are selected according to the function of the eyes' sensitivity to changes in light intensity, the means for dividing the input range of intensity values comprising:
- means for providing a function of eye sensitivity to changes in intensity;
- means for selecting two intermediate points along a curve representing the function of the eyes' sensitivity to changes in intensity;
- means for determining the low intensity section to be the values along a straight line approximation between the beginning of the curve and the first intermediate point selected;
- means for determining the mid intensity section to be the values along a straight line approximation between the first intermediate value and the second intermediate value selected; and
- means for determining the high intensity section to be the values along a straight line approximation between the second intermediate value and the end of the curve.

28. The method of claim 25 wherein:
the digital image to be dithered is depth cued to a dark background;
the greatest concentration of occurrence of intensity values occurs within the low intensity section;
whereby the low intensity section is smaller than the mid and high intensity sections.

29. The apparatus of claim 28 wherein:
p equals 8 thereby providing an input intensity range of 256 values;
q equals 4 thereby providing an output intensity range of 16 values;
the low intensity section of input intensity values extends from 0 to 54;
the mid intensity section of input intensity values extends from 55 to 156; and
the high intensity section of input intensity values extends from 157 to 255.

30. The apparatus of claim 29 wherein:
the low section of output intensity values ranges from 0 to 6, inclusive;
the mid section of output intensity values ranges from 7 to 12, inclusive; and
the high section of output intensity values ranges from 13 to 15, inclusive;
the dither matrix corresponding to the low intensity section having elements in the range of 0 to 7;
the dither matrix corresponding to the mid-intensity section having elements in the range of 0 to 15; and
the dither matrix corresponding to the high intensity section having elements in the range of 0 to 31.

31. The apparatus of claim 30 wherein the digital image is dithered using area dither and the dither matrices comprise the values:

$$\begin{vmatrix} 0 & 7 & 1 & 6 \\ 4 & 2 & 5 & 3 \\ 1 & 6 & 0 & 7 \\ 5 & 3 & 4 & 2 \end{vmatrix}$$

for the matrix which corresponds to the low intensity section;

$$\begin{vmatrix} 1 & 15 & 2 & 12 \\ 9 & 5 & 10 & 6 \\ 3 & 13 & 0 & 14 \\ 11 & 7 & 8 & 4 \end{vmatrix}$$

for the matrix which corresponds to the mid intensity section;

$$\begin{vmatrix} 2 & 30 & 4 & 24 \\ 18 & 10 & 20 & 12 \\ 6 & 26 & 0 & 28 \\ 22 & 14 & 16 & 8 \end{vmatrix}$$

for the matrix which corresponds to the high intensity section.

32. The apparatus of claim 30 wherein the digital image is dithered using vector aligned dither and the dither matrices comprise the values:

|0 4 2 7 1 5 3 6 0 4 2 7 1 5 3 6| for the matrix which corresponds to the low intensity section;

|0 8 4 10 2 12 6 14 1 9 5 11 3 13 7 15| for the matrix which corresponds to the mid intensity section;

|0 16 8 20 4 24 12 28 2 18 10 22 6 25 14 30| for the matrix which corresponds to the high intensity section.

* * * * *

UNITED STATES PATENT AND TRADEMARK OFFICE
CERTIFICATE OF CORRECTION

PATENT NO. : 5,371,515
DATED : December 6, 1994
INVENTOR(S) : Wells et al.

It is certified that error appears in the above-identified patent and that said Letters Patent is hereby corrected as shown below:

In column 18, claim 25 at line 28, please delete " -9 " and insert -- -1 --.

In column 20, claim 32 at line 42, please delete " 04 2 7 " and insert -- 0 4 2 7 --.

Signed and Sealed this

Third Day of November, 1998

*Attest:*

*Attesting Officer*

BRUCE LEHMAN
*Commissioner of Patents and Trademarks*